US008064379B2

(12) United States Patent
Huang et al.

(10) Patent No.: US 8,064,379 B2
(45) Date of Patent: Nov. 22, 2011

(54) COMMUNICATION SYSTEM AND COMMUNICATION METHOD FOR ASSISTING USER RETRIEVING GEOGRAPHY-ASSOCIATED MULTIMEDIA INFORMATION

(75) Inventors: Ting-Han Huang, Taichung (TW); Chih-Yin Lin, Taipei (TW); Chia-Yuan Chang, Taichung (TW)

(73) Assignee: Quanta Computer Inc. (TW)

( * ) Notice: Subject to any disclaimer, the term of this patent is extended or adjusted under 35 U.S.C. 154(b) by 455 days.

(21) Appl. No.: 12/453,311

(22) Filed: May 6, 2009

(65) Prior Publication Data

US 2010/0097989 A1 Apr. 22, 2010

(30) Foreign Application Priority Data

Oct. 20, 2008 (TW) ................................ 97140223 A (51) Int. Cl.
*H04H 20/71* (2008.01)
*G06F 15/16* (2006.01)
*H04Q 7/20* (2006.01)

(52) U.S. Cl. ...................... 370/312; 348/14.02; 348/143; 709/206; 709/231; 455/456.3

(58) Field of Classification Search ............... 348/14.02, 348/143, 151, E5.024, E7.085, E7.086; 340/521–988; 341/174–185; 709/203–232; 455/179.1, 517, 456.3, 547; 715/753; 725/105; 370/310–350

See application file for complete search history.

(56) References Cited

U.S. PATENT DOCUMENTS

| 6,115,611 | A  | * | 9/2000  | Kimoto et al. | ............. 455/456.3 |
| 6,698,021 | B1 | * | 2/2004  | Amini et al.  | .................. 725/105 |
| 7,382,244 | B1 | * | 6/2008  | Donovan et al.| ............. 340/506 |
| 7,860,994 | B2 | * | 12/2010 | Rensin et al. | ................. 709/231 |

FOREIGN PATENT DOCUMENTS

| CN | 01124852.1 | 1/2002 |
| CN | 200410045145.X | 12/2004 |

OTHER PUBLICATIONS

English Abstract of CN01124852.1, Pub. Jan. 16, 2002.
English Abstract of CN200410045145.X, pub. Dec. 1, 2004.

* cited by examiner

*Primary Examiner* — Afsar M. Qureshi
(74) *Attorney, Agent, or Firm* — Thomas, Kayden, Horstemeye, Risley, LLP.

(57) ABSTRACT

The invention discloses a communication system for assisting a user for retrieving geography-associated multimedia information, and the communication system comprises a data processing device and several mobile communication devices. The data processing device receives a first request information including a location term and a time term from a terminal device of the user, and broadcasting a second request information, based on the time term, to the mobile communication devices located within a region relative to the location term. The data processing device receives responding messages and captured audio and/or video data from the mobile communication devices accepting the second request information, and transmitting a location-related information to the terminal device based on the responding messages. The user transmits responding information responsive to the location-related information to the data processing device via the terminal device. The data processing device transmits the captured audio and/or video data (representative of the retrieved geography-associated multimedia information) relative to the responding information to the terminal device.

11 Claims, 5 Drawing Sheets

COMMUNICATION SYSTEM AND COMMUNICATION METHOD FOR ASSISTING USER RETRIEVING GEOGRAPHY-ASSOCIATED MULTIMEDIA INFORMATION

BACKGROUND OF THE INVENTION

1. Field of the Invention

The invention generally relates to a communication system and a communication method, and more particularly, relates to a communication system and a communication method for assisting a user in retrieving geography-associated multimedia information.

2. Description of the Prior Art

With the rapid development of wireless network and wire network, broadband network is popular and a broadband network with wider bandwidth (for example, 3G network applying High Speed UP link Packet Access mobile protocol) is also popular with the public. Thus, web video applications require wider bandwidth, for example, a video sharing website "You Tube", can be developed rapidly.

Currently, users upload multimedia data such as video clips, images, and music to the video sharing websites and the multimedia data is stored in the database of the websites' providers. Other users can filter the data stored in the websites to retrieve the required data by searching, though the users could not retrieve instant data. For example, shop information, road and geographic information, and images shown on the map website are provided by map data providers or uploaded by users. If the required data is not stored in the map websites, what the users can do is just waiting for the map websites to update stored data.

Additionally, webcasting is an interactive application among multimedia web applications and it also provides the newest information. Generally, a broadcaster sets a web camera and a computer connected with the camera. The computer can communicate with other computers through a communication network. Then, the computer executes the webcasting-related application, and the data captured by the web camera can be instantly transmitted to other computers used by other viewers. By doing so, other viewers can transmit text message to the computer through the communication network, and the broadcaster can adjust the shooting angle of the web camera in response to the received text message. Webcasting is an interactive application, but the viewers still passively wait for the video data being transmitted from the broadcaster, and then the viewers interact with the broadcaster.

Thereby, the invention provides a communication system and a communication method for assisting a user in retrieving geography-associated multimedia information comprising audio data, video data, text data, and image information relative to a specific region. In other words, by means of the communication system and the communication method, the user can actively observe events happened in the specific region and retrieves information relative to the specific region rather than passively waits for information provided by other users or the web content provider.

SUMMARY OF THE INVENTION

An aspect of the invention is to provide a communication system for assisting a user in retrieving geography-associated multimedia information.

The communication system comprises a plurality of mobile communication devices and a data processing device. The data processing device is capable of communicating with the mobile communication devices and the user communicates with the data processing device via a terminal device. The data processing device receives a first request information including a location term and a time term from the terminal device.

The data processing device broadcasts a second request information, based on the time term of the first request information, to the mobile communication devices located within a region relative to the location term of the first request information. The data processing device receives responding messages and captured audio and/or video data from the mobile communication devices accepting the second request information, and transmits a location-related information to the terminal device based on the responding messages.

The user transmits a responding information responsive to the location-related information via the terminal device to the data processing device. The data processing device transmits the captured audio and/or video data, relative to the responding information and representative of the retrieved geography-associated multimedia information for the user, to the terminal device.

Another aspect of the invention is to provide a communication method for assisting a user in retrieving geography-associated multimedia information.

The communication method of the invention comprises the steps of:

1) the data processing device receiving a first request information including a location term and a time term from the terminal device;
2) the data processing device broadcasting a second request information, based on the time term, to the mobile communication devices located within a region relative to the location term of the first request information;
3) the data processing device receiving a plurality of responding messages and captured audio and/or video data from the mobile communication devices accepting the second request information;
4) the data processing device transmitting a location-related information to the terminal device based on the responding messages;
5) the user transmitting a responding information responsive to the location-related information to the data processing device via the terminal device; and
6) the data processing device transmitting the captured audio and/or video data relative to the responding information to the terminal device, wherein the captured audio and/or video data is representative of the retrieved geography-associated multimedia information for the user.

To sum up, the terminal device and the mobile communication device of the invention interact with each other via the data processing device. The terminal device sends out a request for retrieving geography-associated multimedia information, and then the mobile communication device retrieves geography-associated information to respond to the request sent from the terminal device. The user actively transmits the request information relative to the time and the location to the data processing device via the terminal device, and then the data processing device communicates with the mobile communication device and transmits data to the mobile communication device according to the request information. Thereby, the terminal device could retrieve the audio, video, and/or image data (i.e. the geography-associated multimedia information) captured by the mobile communication device located within a target region via the data processing device.

The objective of the present invention will no doubt become obvious to those of ordinary skill in the art after reading the following detailed description of the preferred embodiment, which is illustrated in the various figures and drawings.

DETAILED DESCRIPTION OF THE INVENTION

The communication system of the invention assists a user in retrieving geography-associated multimedia information. The geography-associated multimedia information can be, for example, the image (information) of Tamsui riverside (location), the live show (information) of letting off firecrackers around Taipei 101 (location), or a live concert (information) in National Concert Hall (location).

Figure 1:
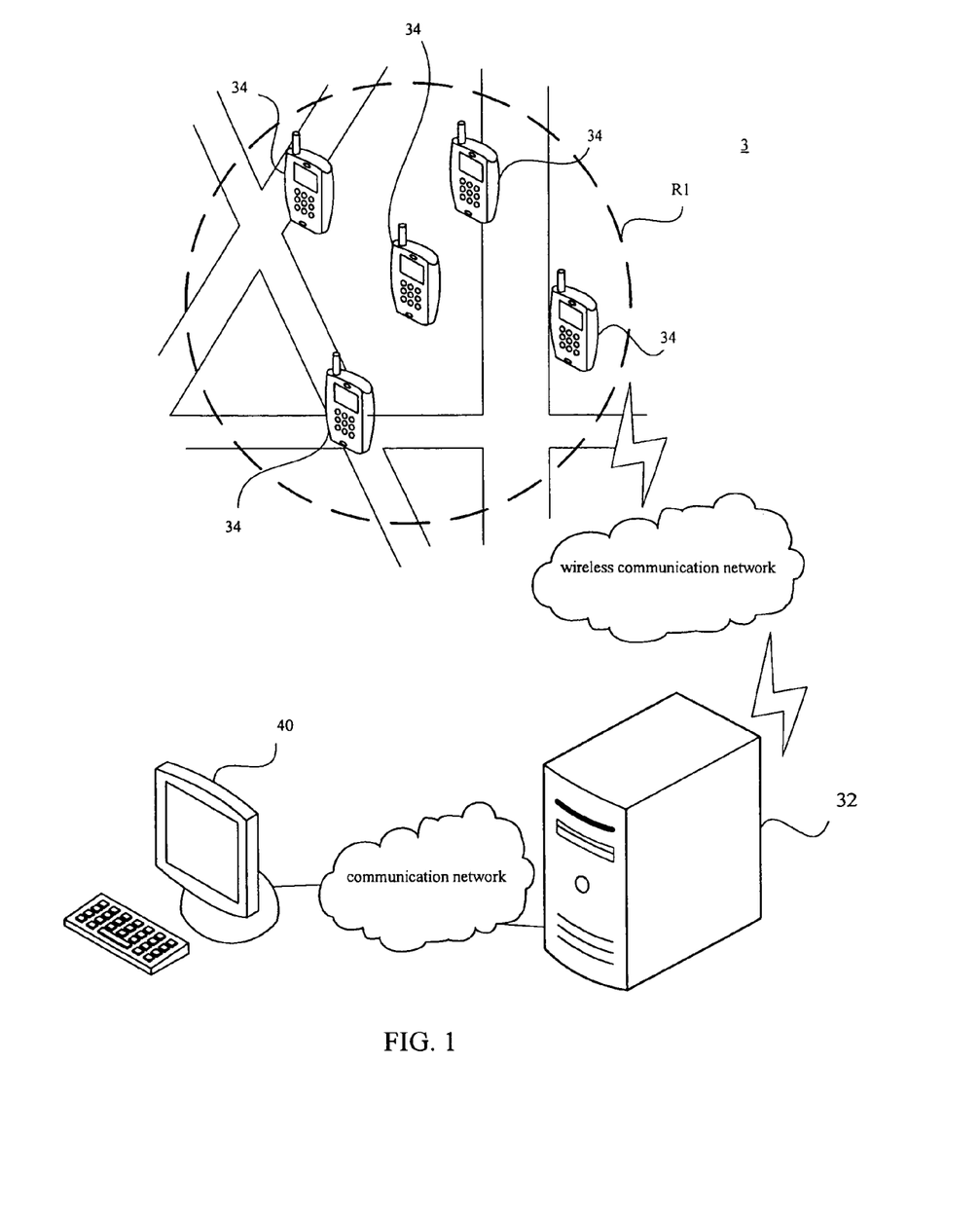
FIG. 1 is a schematic diagram illustrating a communication system according to one embodiment of the invention.

Please refer to FIG. 1. FIG. 1 is a schematic diagram illustrating a communication system 3 according to one embodiment of the invention. As shown in FIG. 1, the communication system 3 of the invention includes a data processing device 32 and several mobile communication devices 34. The data processing device 32 communicates with the mobile communication devices 34 via a wireless network such as a high speed packet access (HSPA) network, a wireless fidelity (Wi-Fi) network, or a worldwide interoperability for microwave access (WiMAX) network. The mobile communication device 34 is an electronic device capable of capturing video or audio, for example, a cell phone, a mobile internet device (MID), a notebook, or a personal digital assistant (PDA). The data processing device 32 is an electronic device or system capable of transmitting requests, receiving requests, and processing data, for example, a web server, a database server, a storage server, or a server cluster consisting of the aforementioned servers. Additionally, the terminal device 40 communicates with the mobile communication devices 34 via the data processing device 32. The terminal device 40 can also be one of the mobile communication devices 34. The mobile communication device 34 and the terminal device 40 can respectively register accounts in the data processing device 32 in advance. By doing so, the data processing device 32 can distinguish different mobile communication devices 34 and terminal devices 40, or classifies and processes different data according to the registered accounts.

The user communicates with the data processing device 32 via the terminal device 40 through the communication network. The communication network can be a wired network (e.g. Ethernet or cable TV network) or a wireless network (e.g. HSPA network, Wi-Fi network, or WiMax network). Therein, the terminal device 40 is an electronic device capable of communication, video displaying, or audio broadcasting, for example, a TV, a desktop computer, a laptop computer, a MID, a PDA, or a cell phone.

Figure 2:
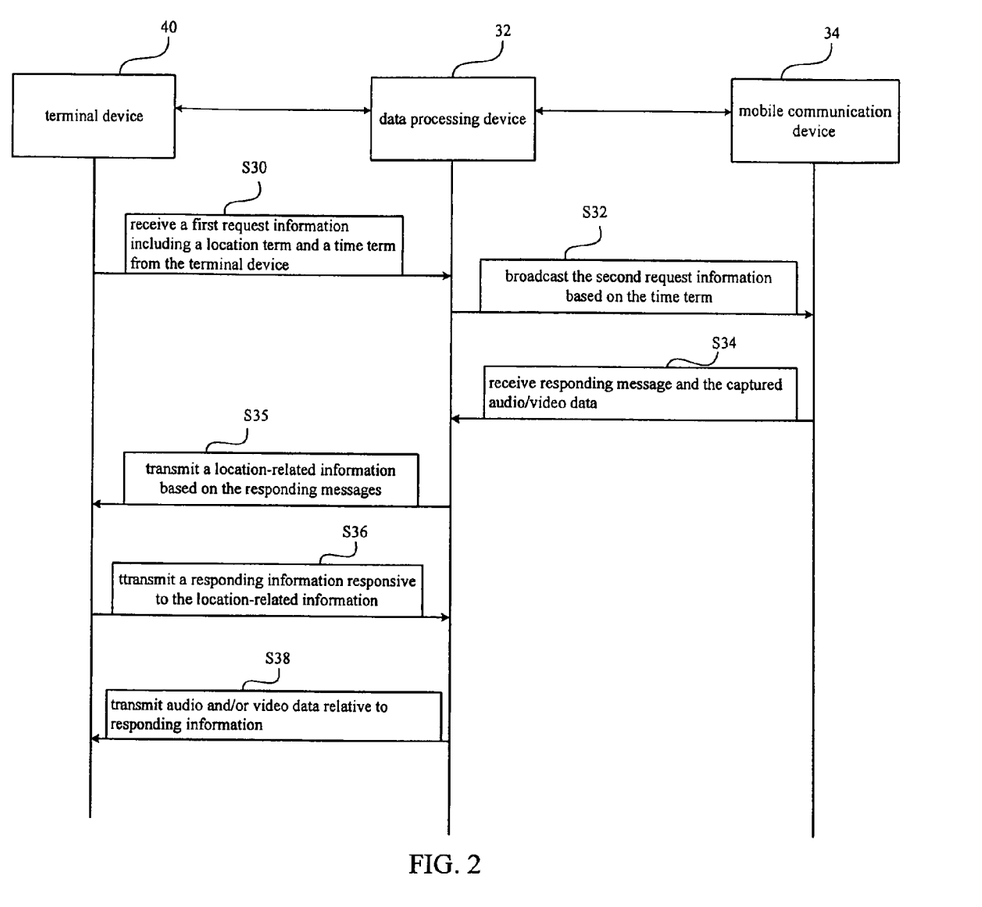
FIG. 2 illustrates a flow chart of a communication method according to one embodiment of the invention.
Figure 4:
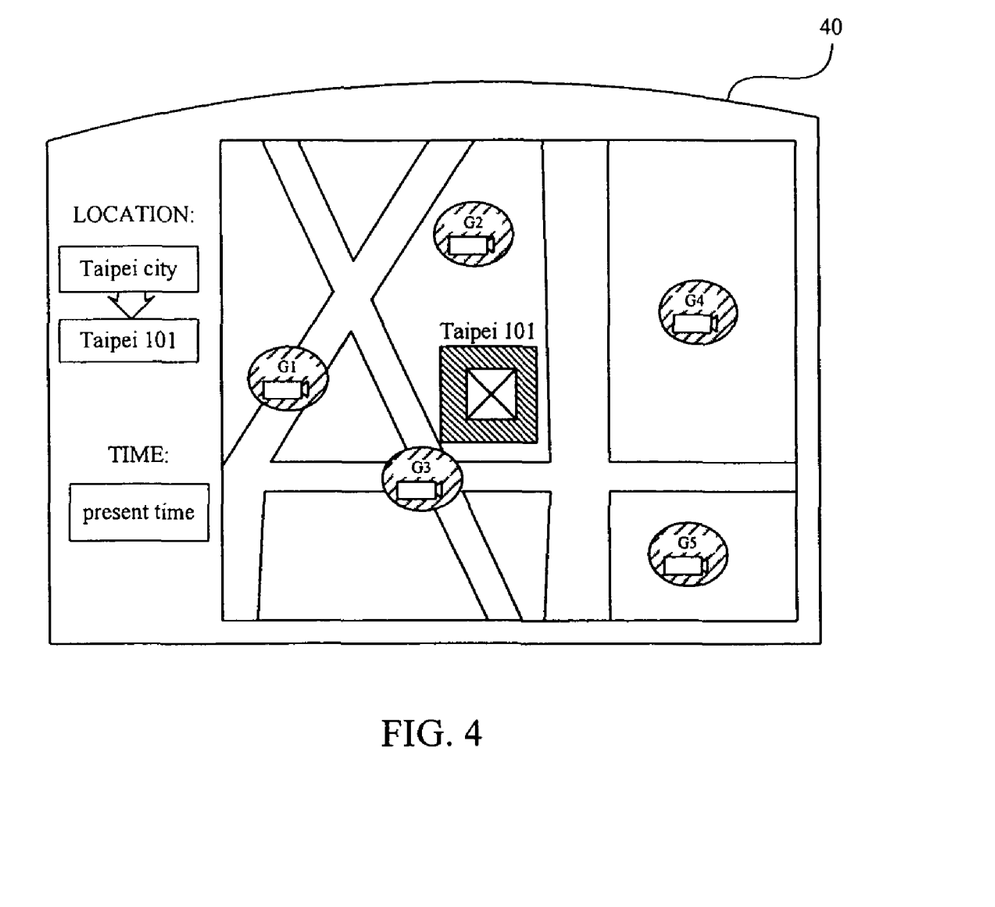
FIG. 4 illustrates a situation corresponding to the step S36 shown in FIG. 2.

Please refer to FIG. 2. FIG. 2 is a flow chart of a communication method according to one embodiment of the invention. First of all, the step S30 is performed. The data processing device 32 receives a first request information including a location term and a time term from the terminal device 40. The time term could be the present time, a specific time (e.g. 12 a.m. tomorrow), or the time interval (e.g. from 9 a.m. tomorrow to 12 a.m. of the day after tomorrow). The location term could be a range of longitude and latitude, famous buildings, or famous landscapes. In fact, if the location term received by the data processing device 32 includes non-longitude and non-latitude information such as famous buildings and famous landscapes, the data processing device 32 will convert the non-longitude and non-latitude information into a corresponsive range of longitude and latitude according to a map database. For example, as shown in FIG. 4, if the location term is set as "Taipei 101", the data processing device 32 correspondingly converts "Taipei 101" into "(25°N~25°05'N, 121°W~121°05'W).

Subsequently, the step S32 is performed. The data processing device 32 broadcasts the second request information, based on the time term, to the mobile communication devices located within a region R1 relative to the location term of the first request information. The mobile communication device 34 includes a positioning module such as a wireless fidelity (Wi-Fi) positioning module, a global positioning system (GPS) module, an assisted global satellite positioning system (AGPS) module, or a Galileo satellite positioning module). The positioning module is used for receiving the positioning signal and transforming the positioning signal into the positioning information, and then the mobile communication device 34 transmits the positioning information to the data processing device 32. The data processing device 32 broadcasts the second request information to the mobile communication device 34 with the positioning information conforming to the location term. For example, the time term of the transmitted first request information is "the present time" and the location term is "Taipei 101". After the data processing device 32 receives the first request information, the data processing device 32 immediately (corresponding to the time term) broadcasts the second request information to the mobile communication device 34 having the positioning information conforming to the Taipei 101 (corresponding to the location term).

Figure 3:
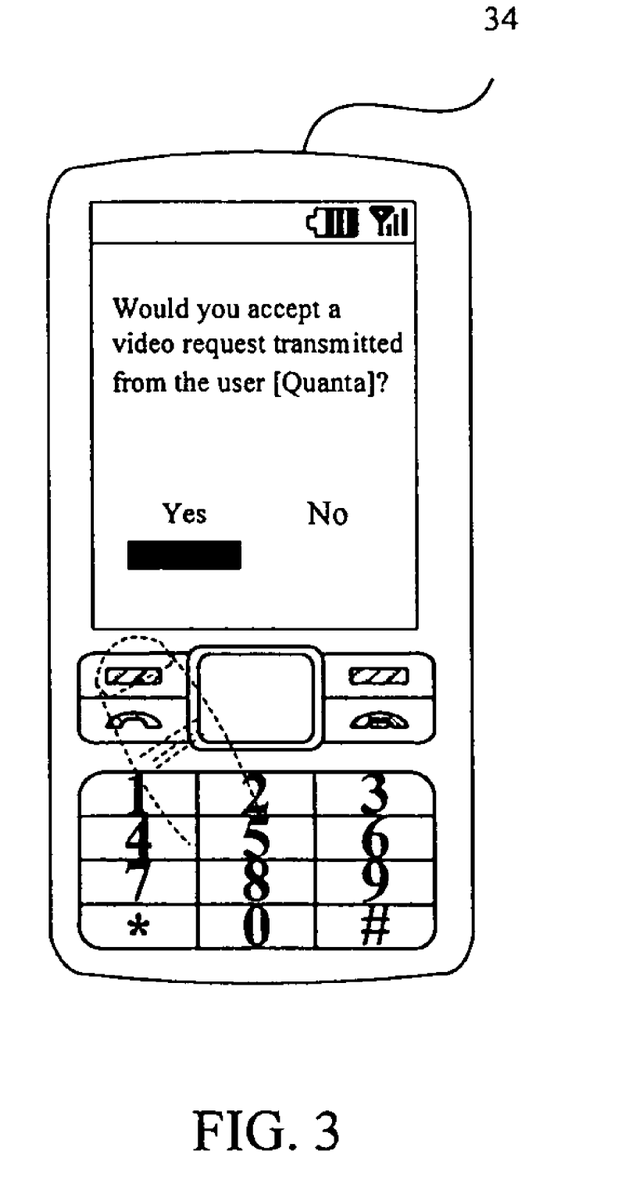
FIG. 3 is a schematic diagram illustrating the second request information displayed on the mobile communication device shown in FIG. 1.

The second request information is a communication establishment request, and the user owning the mobile communication device which receives the second request information can accept or refuse the communication establishment request. As shown in FIG. 3, the second request information displayed on the mobile communication device 34 is "Would you accept a video request transmitted from the user [Quanta]?", wherein "Quanta" is the account registered by the terminal device 40 and stored in the data processing device 32. If the video request is accepted, the mobile communication device 34 transmits a responding message (or transmit a responding message with an acceptance reply) to the data processing device 32. If the video request is refused, the communication device 34 does not transmit a responding message (or transmits a responding message with a negative reply) to the data processing device 32.

Next, the step S34 is performed. The data processing device 32 receives several responding messages and captured audio and/or video data from the several mobile communication devices 34 which accept the second request information. For example, if the data processing device 32 receives five responding messages (or receives ten responding messages, and five of the ten responding messages have the acceptance replies), the data processing device 32 will receive the captured video data from the five mobile communication devices which transmit the responding messages, and caches the captured video data.

There are some additional remarks. The responding message transmitted by the communication device can include authority information such as "PUBLIC", "PRIVATE", "COMMUNITY", and "ACCOUNT". "PUBLIC" means that the captured data can be shared with all terminal devices; "PRIVATE" means that the captured data can be shared with the terminal device passing a confirmation procedure; "COMMUNITY" means that the captured data can be shared with the terminal devices belonging to a specific community; and "ACCOUNT" means that the captured data can be shared with the terminal device registering a specific account. The data processing device 32 determines that the cached video data can be retrieved by which terminal device according to the authority information. Of course, the terminal device 40 which transmits the first request information can retrieve all video data captured from the five mobile communication devices. If one of the five authorized information transmitted by the five mobile communication devices is "PUBLIC" and others are "PRIVATE", only the video data captured by the mobile communication device which sends out "PUBLIC" authority information can be shared with other terminal devices transmitting the first request information including "the present time" and "Taipei 101." If other terminal devices except the terminal device 40 want to retrieve video data captured by these four communication devices which send out "PRIVATE" authority information, these terminal devices need to pass the confirmation procedure including the step S30 and the step S32.

Then, the step S35 is performed. The data processing device 32 transmits a location-related information (for example, longitude and latitude, road name, map codes) to the terminal device 40 based on the responding messages. The data processing device 32 receives the positioning information transmitted from the mobile communication device 34 periodically, so the location-related information includes a positioning information of the mobile communication device 34 transmitting responding messages. For example, the data processing device 32 transmits longitude and latitude information of the five mobile communication devices 34 transmitting responding messages to the terminal device 40. After the terminal device 40 receives five longitude and latitude information, the terminal device 40 executes map software to read in all longitude and latitude information so that the five mark points corresponding with the five longitude and latitude information can be displayed on the map. For example, as shown in FIG. 4, the five mark points are shown near "Taipei 101" on the map displayed by the terminal device 40. In order to make these mark points distinguishable, the registered accounts (e.g. Mary, Jack, Matt, Iris, and Alex) can be appended on the corresponding mark points. For privacy, these registered accounts can be replaced by codes such as G1, G2, G3, G4, and G5, as shown in FIG. 4.

Next, the step S36 is performed. The user transmits a responding information responsive to the location-related information to the data processing device 32 via the terminal device 40. The responding information includes a code and a text (the registered account). For example, the user chooses two mark points coded as "G2" and "G3" from the five mark points. Thus the terminal device 40 transmits a responding information including "G2" and "G3" to the data processing device 32.

Figure 5:
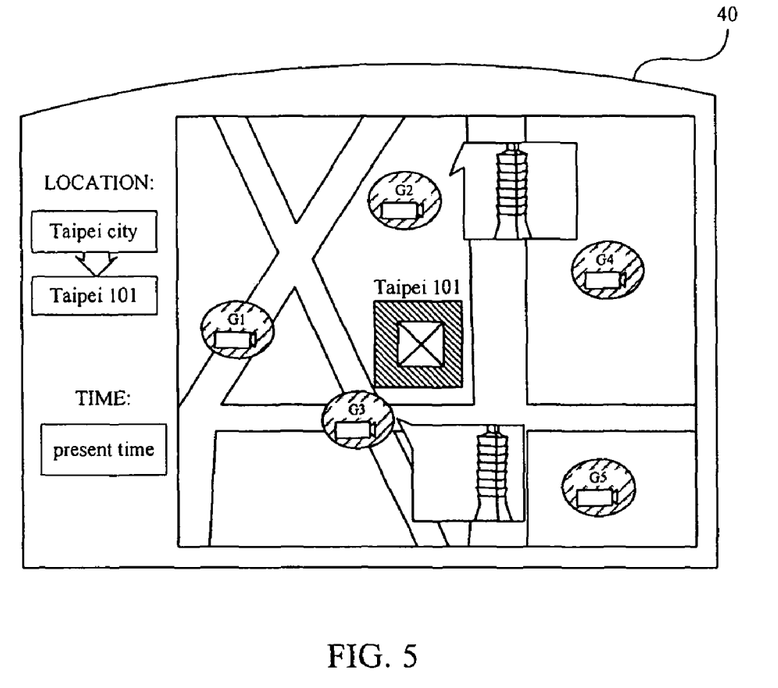
FIG. 5 illustrates a situation corresponding to the step S38 shown in FIG. 2.

Subsequently, the step S38 is performed. The data processing device 32 transmits the audio and/or video data captured by the mobile communication devices 34 relative to the responding information to the terminal device 40, wherein the captured audio and/or video data is representative of the retrieved geography-associated multimedia information for the user. For example, in the step S34, the data processing device 34 caches the video data captured by the five mobile communication devices. Then, in the step S38, the data processing device 32 filters the cached video data and finds out video data of the mobile communication devices 34 corresponding to "G2" and "G3". Next, as shown in FIG. 5, the terminal device 40 could show the captured video data of the two mobile communication devices coded as "G2" and "G3" near Taipei 101.

In this invention, the geography-associated multimedia information is classified into instant geography-associated multimedia information and non-instant geography-associated multimedia information. The instant geography-associated multimedia information means the information relative to a specific region at the present time. The non-instant geography-associated multimedia information means the information relative to a specific region at a specific time or a time interval. The aforementioned example (the video data captured by the mobile communication devices near Taipei 101 at the present time) is an instant geography-associated multimedia information.

If the time term of the first request information transmitted from the terminal device is a specific time, after the data processing device 32 receives the first request information, the following steps will be performed at the specific time. Thus the user retrieves the geography-associated multimedia information at the specific time. For example, the user wants to join the live concert in National Concert Hall three days from now. The user transmits the first request for information to the data processing device via the terminal device, and the location term of the first request information is set as "National Concert Hall" and the time term is set as "three days". After three days, the data processing device broadcasts an audio request (the second requested information) to several mobile communication devices in the National Concert Hall. Then, the data processing device can transmit the audio data, captured by the mobile communication device responding to the audio request, to the terminal device. Thereby, the user could retrieve non-instant geography-associated multimedia information by configuring the time term.

Additionally, if the time term of the first request information transmitted by the terminal device 40 is a time interval, and the time interval includes a starting time and a closure time. After the data processing device 32 receives the first request information, it will continuously broadcast the second request information after the starting time and before the closure time. Therefore, in this time interval, all mobile communication devices 34 located within the region relative to the location term will receive the second request information. Thus the user could retrieve the geography-associated multimedia information within the time interval. If the time interval is configured to be a long time, it means the user subscribes to the geography-associated multimedia information relative to the region. When new geography-associated multimedia information relative to the region is generated or geography-associated multimedia information relative to the region is changed, the user can instantly retrieve the new or changed multimedia information via the terminal 40

Additionally, if the time term is a time interval, the terminal device 40 generates a moving path information according to the time interval and the location-related information received in the time interval. The location-related information includes a positioning information conforming to the location term. If several mobile communication devices 34 move within the region relative to the location term in the time interval, the terminal devices 40 could receive several changed positioning information. According to the time interval and several changed positioning information, the terminal device 40 could compute several moving path information and then displays several moving paths on the map. Moreover, the terminal device 40 could integrate the moving path information with the captured video data transmitted from the mobile communication device corresponding to the moving path, so as to show the video data varying with the variation of the moving path.

If the user wants to further filter the retrievable geography-associated multimedia information, the first request information can include other variables except the time term and the location term, for example, an event term. In another embodiment, besides time comparison and location comparison, the communication system and method of the invention could retrieve the desired geography-associated multimedia information by the event comparison.

In this embodiment, the mobile communication device transmits an event information to the data processing device. For example, the mobile communication device is located near a scene of a car accident. Before the mobile communication device captures the video/audio data, the mobile communication device transmits an event information including "car accident" to the data processing device. Then, the first request information transmitted by the terminal device further includes an event term. After the data processing device receives the first request information, the data processing device broadcasts the second request information to the mobile communication devices transmitting the event information relative to the event term. The relativity between the event information and the event term can be adjusted according to practical situation. If the event information is relative to the event term, the content of the event information is not necessarily equivalent to the content of the event term.

For example, the required geography associated multimedia information is the video data of a car accident occurred in Taipei city. The time term of the first request information transmitted from the terminal device can be configured as "present time"; the location term can be configured as "Taipei"; and the event term can be configured as "car accident". Therefore, the data processing device broadcasts the second request information to the mobile communication devices located within "Taipei" city at "present time" and transmitting the event information relative to "car accident".

Compared with the prior art, the terminal device and the mobile communication devices of the invention interact with each other via the data processing device. The terminal device sends out a request of retrieving geography-associated multimedia information, and then the mobile communication device retrieves geography-associated information to respond to the request sent from the terminal device. The user actively transmits a request information relative to the time and the location to the data processing device via the terminal device, and then the data processing device communicates with the mobile communication device and transmits data to the mobile communication device according to the request information. Thereby, the terminal device could retrieve the audio, video, and/or image data (i.e. the geography-associated multimedia information) captured by the mobile communication device located within a target region via the data processing device.

Although the present invention has been illustrated and described with reference to the preferred embodiment thereof, it should be understood that it is in no way limited to the details of such embodiment but is capable of numerous modifications within the scope of the appended claims.

What is claimed is:

1. A communication system for assisting a user in retrieving geography-associated multimedia information, the user communicating with the communicating system via a terminal device, the communication system comprising:
   a plurality of mobile communication devices; and
   a data processing device, capable of communicating with the mobile communication devices, receiving a first request information including a location term and a time term from the terminal device, broadcasting a second request information, based on the time term, to the mobile communication devices located within a region relative to the location term, receiving a plurality of responding messages and captured audio and/or video data from the mobile communication devices accepting the second request information, and transmitting a location-related information to the terminal device based on the responding messages,
   wherein the user transmits a responding information responsive to the location-related information to the data processing device via the terminal device, the data processing device transmits the captured audio and/or video data, relative to the responding information and representative of the retrieved geography-associated multimedia information for the user, to the terminal device.

2. The communication system of claim 1, wherein each mobile communication device comprises a positioning module for receiving a positioning signal and transforming the positioning signal into a positioning information, the mobile communication devices transmit the positioning information to the data processing device, the data processing device broadcasts the second request information to the mobile communication devices transmitting the positioning information relative to the location term.

3. The communication system of claim 2, wherein the positioning module is a wireless fidelity (Wi-Fi) positioning module, a global positioning system (GPS) module, an assisted global satellite positioning system (AGPS) module, or a Galileo satellite positioning module.

4. The communication system of claim 1, wherein the time term is a time interval, the terminal device generating a moving path information according to the time interval and the location-related information received in the time interval.

5. The communication system of claim 1, wherein the first request information further comprises an event term, the data processing device receiving a plurality of event information from the mobile communication devices and broadcasting the second request information to the mobile communication devices which transmit the event information relative to the event term and is located within the region relative to the location term.

6. The communication system of claim 1, wherein the data processing device communicates with mobile communication devices via a wireless communication network.

7. The communication system of claim 6, wherein the wireless communication network is a high speed packet access (HSPA) network, a wireless fidelity (Wi-Fi) positioning network, or a worldwide interoperability for microwave access (WiMAX) network.

8. A communication method for assisting a user in retrieving geography-associated multimedia information, the user communicating with a data processing device via a terminal device, the data processing device being capable of communicating with a plurality of mobile communication devices, comprising the steps of:

the data processing device receiving a first request information including a location term and a time term from the terminal device;

the data processing device broadcasting a second request information, based on the time term, to the mobile communication devices located within a region relative to the location term of the first request information;

the data processing device receiving a plurality of responding messages and captured audio and/or video data from the mobile communication devices accepting the second request information;

the data processing device transmitting a location-related information to the terminal device based on the responding messages;

the user transmitting a responding information responsive to the location-related information to the data processing device via the terminal device; and the data processing device transmitting the captured audio and/or video data relative to the responding information to the terminal device, wherein the captured audio and/or video data is representative of the retrieved geography-associated multimedia information for the user.

9. The communication method of claim 8, wherein each mobile communication device comprises a positioning module for receiving a positioning signal and transforming the positioning signal into a positioning information, the step of the data processing device broadcasting the second request information comprising the following steps of:

the mobile communication devices transmitting the positioning information to the data processing device; and the data processing device broadcasting the second request information, based on the time term, to the mobile communication devices transmitting the positioning information relative to the location term.

10. The communication method of claim 8, wherein the time term is a time interval, the communication method further comprises the following step of:

the terminal device generating a moving path information according to the time interval and the location-related information received in the time interval.

11. The communication method of claim 8, wherein the first request information further comprises an event term, comprising the steps of:

the data processing device receiving a plurality of event information from the mobile communication devices; and the data processing device broadcasting the second request information, based on the time term, to the mobile communication devices which transmit the event information relative to the event term and is located within the region relative to the location term.

* * * * *